US009588781B2

(12) United States Patent
Larsson et al.

(10) Patent No.: US 9,588,781 B2
(45) Date of Patent: Mar. 7, 2017

(54) ASSOCIATING COMMAND SURFACES WITH MULTIPLE ACTIVE COMPONENTS

(75) Inventors: Josef Larsson, Des Moines, WA (US); Eric Bailey, Issaquah, WA (US); Tim McConnell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 12/059,644

(22) Filed: Mar. 31, 2008

(65) Prior Publication Data

US 2009/0249339 A1 Oct. 1, 2009

(51) Int. Cl.
*G06F 3/0482* (2013.01)
*G06F 9/44* (2006.01)
*G06F 3/0483* (2013.01)

(52) U.S. Cl.
CPC ........... *G06F 9/4443* (2013.01); *G06F 3/0482* (2013.01); *G06F 3/0483* (2013.01)

(58) Field of Classification Search
CPC .... G06F 3/0481; G06F 9/4443; G06F 3/0482; G06F 3/04817; G06F 3/0483; G06F 3/0236; G06F 17/30873; G06F 2216/15; G06F 17/3089; G06F 17/30997; H04N 5/44543; H04N 21/482; H04L 29/0809
USPC ....... 715/760, 711, 724, 779, 810, 825, 835, 715/841, 845; 707/707, E17.111
See application file for complete search history.

(56) References Cited

U.S. PATENT DOCUMENTS

| | | | |
|---|---|---|---|
| 4,815,029 A | 3/1989 | Barker et al. | |
| 4,823,283 A | 4/1989 | Diehm et al. | 715/825 |
| 5,155,806 A | 10/1992 | Hoeber et al. | 715/711 |
| 5,243,697 A | 9/1993 | Hoeber et al. | |
| 5,377,354 A | 12/1994 | Scannell et al. | 718/103 |
| 5,475,805 A | 12/1995 | Murata | 715/513 |
| 5,500,936 A | 3/1996 | Allen et al. | 395/156 |
| 5,519,606 A | 5/1996 | Frid-Nielsen et al. | 705/9 |
| 5,533,184 A | 7/1996 | Malcolm | 715/762 |
| 5,559,944 A | 9/1996 | Ono | 715/841 |

(Continued)

FOREIGN PATENT DOCUMENTS

| | | |
|---|---|---|
| CN | 101243439 B | 6/2012 |
| CN | 102317897 B | 7/2013 |

(Continued)

OTHER PUBLICATIONS

Run for the border: using borders in Word (published on Apr. 6, 2004) https://web.archive.org/web/20040324224844/http://word.mvps.org/FAQs/TblsFldsFms/Borders.htm.*

(Continued)

*Primary Examiner* — Jeffrey A Gaffin
*Assistant Examiner* — Rinna Yi
(74) *Attorney, Agent, or Firm* — Julie Kane Akhter; Tom Wong; Micky Minhas

(57) ABSTRACT

The same command surface on a page may be associated with unrelated components and applications. Each of the components registers the commands associated with a shared command surface that they will be utilizing. Each component may utilize an arbitrary number of commands that are associated with the command surface. The command manager acts as a message broker between the components on the page and the command surfaces. When a command that is associated with a command surface is received, the command manager dispatches the command message to the appropriate components.

19 Claims, 4 Drawing Sheets

(56) References Cited

U.S. PATENT DOCUMENTS

| | | | | |
|---|---|---|---|---|
| 5,570,109 | A | 10/1996 | Jenson | 715/823 |
| 5,588,107 | A | 12/1996 | Bowden et al. | 715/828 |
| 5,596,694 | A | 1/1997 | Capps | 345/473 |
| 5,625,783 | A | 4/1997 | Ezekiel et al. | 395/352 |
| 5,634,100 | A | 5/1997 | Capps | 705/9 |
| 5,634,128 | A | 5/1997 | Messina | 710/200 |
| 5,638,504 | A | 6/1997 | Scott et al. | 715/202 |
| 5,644,737 | A | 7/1997 | Tuniman et al. | 715/810 |
| 5,659,693 | A | 8/1997 | Hansen et al. | 715/779 |
| 5,664,127 | A | 9/1997 | Anderson et al. | 715/209 |
| 5,664,208 | A | 9/1997 | Pavley et al. | 715/209 |
| 5,673,403 | A | 9/1997 | Brown et al. | 715/744 |
| 5,721,847 | A | 2/1998 | Johnson | 715/786 |
| 5,734,915 | A | 3/1998 | Roewer | 395/773 |
| 5,751,373 | A | 5/1998 | Ohyama et al. | |
| 5,760,768 | A | 6/1998 | Gram | 345/333 |
| 5,760,773 | A | 6/1998 | Berman et al. | 715/808 |
| 5,761,646 | A | 6/1998 | Frid-Nielsen et al. | 705/9 |
| 5,778,402 | A | 7/1998 | Gipson | 715/201 |
| 5,778,404 | A | 7/1998 | Capps et al. | 715/531 |
| 5,796,393 | A | 8/1998 | MacNaughton et al. | |
| 5,805,167 | A | 9/1998 | Van Cruyningen | 715/808 |
| 5,812,132 | A | 9/1998 | Goldstein | 715/797 |
| 5,821,936 | A | 10/1998 | Shaffer et al. | 715/810 |
| 5,828,376 | A | 10/1998 | Solimene et al. | 715/821 |
| 5,838,321 | A | 11/1998 | Wolf | 345/343 |
| 5,842,009 | A | 11/1998 | Borovoy et al. | 707/1 |
| 5,844,558 | A | 12/1998 | Kumar et al. | 345/339 |
| 5,844,572 | A | 12/1998 | Schott | 345/440 |
| 5,855,006 | A | 12/1998 | Huemoeller et al. | 705/9 |
| 5,885,006 | A | 3/1999 | Sheedy | 384/192 |
| 5,893,125 | A | 4/1999 | Shostak | 715/206 |
| 5,895,476 | A | 4/1999 | Orr et al. | 715/202 |
| 5,898,436 | A | 4/1999 | Stewart et al. | 345/354 |
| 5,899,979 | A | 5/1999 | Miller et al. | 705/9 |
| 5,903,902 | A | 5/1999 | Orr et al. | 715/517 |
| 5,905,863 | A | 5/1999 | Knowles et al. | 709/206 |
| 5,914,714 | A | 6/1999 | Brown | 715/866 |
| 5,926,806 | A | 7/1999 | Marshall et al. | 707/3 |
| 5,936,625 | A | 8/1999 | Kahl et al. | 715/775 |
| 5,940,078 | A | 8/1999 | Nagarajayya et al. | 345/346 |
| 5,940,847 | A | 8/1999 | Fein et al. | 707/540 |
| 5,943,051 | A | 8/1999 | Onda et al. | 715/786 |
| 5,956,737 | A | 9/1999 | King et al. | 715/517 |
| 5,960,406 | A | 9/1999 | Rasansky et al. | 705/9 |
| 5,970,466 | A | 10/1999 | Detjen et al. | 705/8 |
| 5,999,938 | A | 12/1999 | Bliss et al. | 707/102 |
| 6,002,395 | A | 12/1999 | Wagner et al. | 715/763 |
| 6,008,806 | A | 12/1999 | Nakajima et al. | 345/335 |
| 6,012,075 | A | 1/2000 | Fein et al. | 707/540 |
| 6,018,343 | A | 1/2000 | Wang et al. | 345/356 |
| 6,034,683 | A | 3/2000 | Mansour et al. | 715/764 |
| 6,043,816 | A | 3/2000 | Williams et al. | 345/340 |
| 6,057,836 | A | 5/2000 | Kavalam et al. | |
| 6,067,087 | A | 5/2000 | Krauss et al. | 715/762 |
| 6,072,492 | A | 6/2000 | Schagen et al. | 715/733 |
| 6,085,206 | A | 7/2000 | Domini et al. | 707/533 |
| 6,101,480 | A | 8/2000 | Conmy et al. | 705/9 |
| 6,133,915 | A | 10/2000 | Arcuri et al. | 715/779 |
| 6,175,363 | B1 | 1/2001 | Williams et al. | 345/334 |
| 6,188,401 | B1 | 2/2001 | Peyer | 715/805 |
| 6,188,403 | B1 | 2/2001 | Sacerdoti et al. | 715/764 |
| 6,192,381 | B1 | 2/2001 | Stiegemeier et al. | 715/210 |
| 6,211,879 | B1 | 4/2001 | Soohoo | 715/854 |
| 6,216,122 | B1 | 4/2001 | Elson | 707/5 |
| 6,219,670 | B1 | 4/2001 | Mocek et al. | 707/102 |
| 6,222,540 | B1 | 4/2001 | Sacerdoti | 345/581 |
| 6,230,173 | B1 | 5/2001 | Ferrel et al. | |
| 6,230,309 | B1 | 5/2001 | Turner et al. | 717/1 |
| 6,232,971 | B1 | 5/2001 | Haynes | 715/800 |
| 6,236,396 | B1 | 5/2001 | Jenson | 715/764 |
| 6,256,628 | B1 | 7/2001 | Dobson et al. | 707/6 |
| 6,278,450 | B1 | 8/2001 | Arcuri et al. | 345/334 |
| 6,289,317 | B1 | 9/2001 | Peterson | 705/7 |
| 6,307,544 | B1 | 10/2001 | Harding | 715/709 |
| 6,323,883 | B1 | 11/2001 | Minoura et al. | 715/784 |
| 6,353,451 | B1 | 3/2002 | Teibel et al. | 715/803 |
| 6,359,634 | B1 | 3/2002 | Cragun et al. | 715/777 |
| 6,373,507 | B1 | 4/2002 | Camara et al. | 345/825 |
| 6,381,740 | B1 | 4/2002 | Miller et al. | 717/151 |
| 6,384,849 | B1 | 5/2002 | Morcos et al. | 715/810 |
| 6,405,216 | B1 | 6/2002 | Minnaert et al. | 707/104.1 |
| 6,424,829 | B1 | 7/2002 | Kraft | 455/412.1 |
| 6,429,882 | B1 | 8/2002 | Abdelnur et al. | 345/763 |
| 6,433,801 | B1 | 8/2002 | Moon et al. | 345/840 |
| 6,433,831 | B1 | 8/2002 | Dinwiddie et al. | 348/553 |
| 6,456,304 | B1 | 9/2002 | Angiulo et al. | 345/779 |
| 6,459,441 | B1 | 10/2002 | Perroux et al. | 345/837 |
| 6,466,236 | B1 | 10/2002 | Pivowar et al. | 715/835 |
| 6,469,722 | B1 | 10/2002 | Kineo et al. | 345/837 |
| 6,476,828 | B1 | 11/2002 | Burkett et al. | 715/760 |
| 6,480,865 | B1 | 11/2002 | Lee et al. | 715/523 |
| 6,493,006 | B1 | 12/2002 | Gourdol et al. | 715/825 |
| 6,493,731 | B1 | 12/2002 | Jones et al. | 715/234 |
| 6,546,417 | B1 | 4/2003 | Baker | 709/206 |
| 6,564,377 | B1 | 5/2003 | Jayasimha et al. | 717/174 |
| 6,570,596 | B2 | 5/2003 | Frederiksen | 715/808 |
| 6,578,192 | B1 | 6/2003 | Boehme et al. | 717/115 |
| 6,583,798 | B1 | 6/2003 | Hoek et al. | 345/822 |
| 6,603,493 | B1 | 8/2003 | Lovell et al. | |
| 6,618,732 | B1 | 9/2003 | White et al. | 707/103 |
| 6,621,504 | B1 | 9/2003 | Nadas et al. | 715/723 |
| 6,621,508 | B1 | 9/2003 | Shiraishi et al. | 715/810 |
| 6,624,831 | B1 | 9/2003 | Shahine et al. | 715/815 |
| 6,635,089 | B1 | 10/2003 | Burkett et al. | 715/513 |
| 6,639,611 | B1 | 10/2003 | Leduc | 715/764 |
| 6,664,983 | B2 | 12/2003 | Ludolph | 715/775 |
| 6,680,749 | B1 | 1/2004 | Anderson et al. | 348/231.99 |
| 6,686,938 | B1 | 2/2004 | Jobs et al. | 345/835 |
| 6,691,281 | B1 | 2/2004 | Sorge et al. | 715/234 |
| 6,707,476 | B1 | 3/2004 | Hochstedler | 715/789 |
| 6,708,205 | B2 | 3/2004 | Sheldon et al. | 709/206 |
| 6,727,919 | B1 | 4/2004 | Reder et al. | 715/810 |
| 6,732,330 | B1 | 5/2004 | Claussen et al. | 715/513 |
| 6,734,880 | B2 | 5/2004 | Chang et al. | 715/738 |
| 6,750,890 | B1 | 6/2004 | Sugimoto | 715/838 |
| 6,778,990 | B2 | 8/2004 | Garcia et al. | 707/10 |
| 6,785,866 | B1 | 8/2004 | Lewis et al. | 715/209 |
| 6,785,868 | B1 | 8/2004 | Raff | 715/530 |
| 6,825,859 | B1 | 11/2004 | Severenuk et al. | 345/764 |
| 6,826,727 | B1 | 11/2004 | Mohr et al. | 715/235 |
| 6,826,729 | B1 | 11/2004 | Giesen et al. | 715/837 |
| 6,850,255 | B2 | 2/2005 | Muschetto | 715/788 |
| 6,857,103 | B1 | 2/2005 | Wason | 715/709 |
| 6,871,195 | B2 | 3/2005 | Ryan et al. | 706/46 |
| 6,882,354 | B1 | 4/2005 | Nielsen | 715/784 |
| 6,904,449 | B1 | 6/2005 | Quinones | 709/203 |
| 6,906,717 | B2 | 6/2005 | Couckuyt et al. | 345/440 |
| 6,915,492 | B2 | 7/2005 | Kurtenbach et al. | 715/810 |
| 6,924,797 | B1 | 8/2005 | MacPhail | 345/326 |
| 6,928,610 | B2 | 8/2005 | Brintzenhofe et al. | 715/202 |
| 6,931,623 | B2 | 8/2005 | Vermeire et al. | 717/108 |
| 6,956,429 | B2 | 10/2005 | Elbanhawy | |
| 6,964,025 | B2 | 11/2005 | Angiulo | 715/838 |
| 6,983,889 | B2 | 1/2006 | Alles | 236/49.1 |
| 6,988,241 | B1 | 1/2006 | Guttman et al. | 715/503 |
| 6,990,637 | B2 | 1/2006 | Anthony et al. | 715/851 |
| 6,990,654 | B2 | 1/2006 | Carroll, Jr. | |
| 6,993,711 | B1 | 1/2006 | Tanaka et al. | 715/513 |
| 7,016,864 | B1 | 3/2006 | Notz et al. | |
| 7,027,463 | B2 | 4/2006 | Mathew et al. | |
| 7,032,210 | B2 | 4/2006 | Alloing et al. | |
| 7,039,596 | B1 | 5/2006 | Lu | 705/8 |
| 7,039,863 | B1 | 5/2006 | Caro et al. | 715/209 |
| 7,046,848 | B1 | 5/2006 | Olcott | 382/176 |
| 7,051,276 | B1 | 5/2006 | Mogilevsky et al. | 715/517 |
| 7,085,999 | B2 | 8/2006 | Maeda et al. | 715/236 |
| 7,086,006 | B2 | 8/2006 | Subramanian | |
| 7,093,162 | B2 | 8/2006 | Barga et al. | 714/15 |
| 7,107,525 | B2 | 9/2006 | Purvis | 715/244 |
| 7,107,544 | B1 | 9/2006 | Luke | 715/752 |
| 7,110,936 | B2 | 9/2006 | Hiew et al. | 703/22 |
| 7,117,436 | B1 | 10/2006 | O'Rourke et al. | 715/205 |
| 7,120,868 | B2 | 10/2006 | Salesin et al. | 715/249 |

(56) References Cited

U.S. PATENT DOCUMENTS

| | | | |
|---|---|---|---|
| 7,152,207 B1 | 12/2006 | Underwood et al. | 715/526 |
| 7,174,361 B1 | 2/2007 | Paas | 709/203 |
| 7,188,073 B1 | 3/2007 | Tam et al. | 705/9 |
| 7,188,158 B1 | 3/2007 | Stanton et al. | 709/220 |
| 7,212,208 B2 | 5/2007 | Khozai | 345/440 |
| 7,216,302 B2 | 5/2007 | Rodden et al. | 715/811 |
| 7,218,976 B2 | 5/2007 | Minagawa | |
| 7,219,305 B2 | 5/2007 | Jennings | |
| 7,225,244 B2 | 5/2007 | Reynolds | |
| 7,234,132 B2 | 6/2007 | Lam | 717/120 |
| 7,240,323 B1 | 7/2007 | Desai et al. | 717/100 |
| 7,246,311 B2 | 7/2007 | Bargeron et al. | 715/251 |
| 7,249,325 B1 | 7/2007 | Donaldson | 715/777 |
| 7,263,668 B1 | 8/2007 | Lentz | 715/801 |
| 7,272,789 B2 | 9/2007 | O'Brien | 715/247 |
| 7,281,245 B2 | 10/2007 | Reynar et al. | 717/173 |
| 7,318,203 B2 | 1/2008 | Purves et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,537 B2 | 4/2008 | Reynar et al. | 715/234 |
| 7,360,174 B2 | 4/2008 | Grossman et al. | 715/854 |
| 7,632,311 B2 | 4/2008 | Filner et al. | 345/169 |
| 7,386,535 B1 | 6/2008 | Kalucha et al. | |
| 7,386,835 B1 | 6/2008 | Desai | |
| 7,392,249 B1 | 6/2008 | Harris et al. | 707/5 |
| 7,395,540 B2 | 7/2008 | Rogers | 719/310 |
| 7,426,713 B2 | 9/2008 | Duggan et al. | |
| 7,472,374 B1 | 12/2008 | Dillman et al. | 717/102 |
| 7,484,213 B2 | 1/2009 | Mathew et al. | |
| 7,505,954 B2 | 3/2009 | Heidloff et al. | 707/1 |
| 7,509,328 B2 | 3/2009 | Weis et al. | 717/103 |
| 7,530,029 B2 | 5/2009 | Satterfield et al. | 715/779 |
| 7,555,707 B1 | 6/2009 | Labarge et al. | |
| 7,567,964 B2 | 7/2009 | Brice et al. | 707/9 |
| 7,610,575 B2 | 10/2009 | Sproule | 717/103 |
| 7,627,561 B2 | 12/2009 | Pell et al. | 707/3 |
| 7,703,036 B2 | 4/2010 | Satterfield et al. | 715/777 |
| 7,769,698 B2 | 8/2010 | Matic | 705/77 |
| 7,779,386 B2 | 8/2010 | Seitz et al. | 717/108 |
| 7,827,546 B1 | 11/2010 | Jones et al. | 717/173 |
| 7,856,596 B2 | 12/2010 | Crider et al. | 715/243 |
| 7,860,901 B2 | 12/2010 | Cheng et al. | 707/805 |
| 7,886,290 B2 | 2/2011 | Dhanjal et al. | 717/170 |
| 7,908,580 B2 | 3/2011 | Stubbs et al. | 717/100 |
| 7,925,621 B2 | 4/2011 | Sikchi et al. | 707/609 |
| 7,949,963 B1 * | 5/2011 | Pham et al. | 715/851 |
| 8,046,683 B2 | 10/2011 | Larcheveque et al. | 715/237 |
| 8,239,882 B2 | 8/2012 | Dhanjal et al. | |
| 8,255,828 B2 | 8/2012 | Harris et al. | |
| 8,302,014 B2 | 10/2012 | Guadarrama et al. | |
| 8,799,353 B2 | 8/2014 | Larsson et al. | |
| 9,015,621 B2 | 4/2015 | Dean et al. | |
| 9,223,477 B2 | 12/2015 | Harris et al. | |
| 2001/0014900 A1 | 8/2001 | Brauer et al. | 707/513 |
| 2001/0035882 A1 | 11/2001 | Stoakley et al. | |
| 2002/0007380 A1 | 1/2002 | Bauchot et al. | 707/530 |
| 2002/0036662 A1 * | 3/2002 | Gauthier et al. | 345/835 |
| 2002/0037754 A1 | 3/2002 | Hama et al. | 455/566 |
| 2002/0052721 A1 | 5/2002 | Ruff et al. | 703/1 |
| 2002/0070977 A1 * | 6/2002 | Morcos et al. | 345/810 |
| 2002/0075330 A1 | 6/2002 | Rosenzweig et al. | 345/854 |
| 2002/0078143 A1 | 6/2002 | DeBoor et al. | 709/203 |
| 2002/0083097 A1 | 6/2002 | Warrington | 715/229 |
| 2002/0091739 A1 | 7/2002 | Ferlitsch | 707/526 |
| 2002/0099775 A1 | 7/2002 | Gupta et al. | |
| 2002/0122071 A1 | 9/2002 | Camara et al. | 715/810 |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | 715/810 |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0156815 A1 | 10/2002 | Davia | 707/517 |
| 2002/0163538 A1 | 11/2002 | Shteyn | 345/752 |
| 2002/0175955 A1 | 11/2002 | Gourdol et al. | 345/821 |
| 2002/0188632 A1 | 12/2002 | Su | 707/513 |
| 2002/0196293 A1 | 12/2002 | Suppan et al. | 345/853 |
| 2003/0009455 A1 | 1/2003 | Carlson et al. | |
| 2003/0011638 A1 | 1/2003 | Chung | 345/808 |
| 2003/0011639 A1 | 1/2003 | Webb | 715/808 |
| 2003/0014490 A1 | 1/2003 | Bates et al. | 709/206 |
| 2003/0022700 A1 | 1/2003 | Wang | 455/566 |
| 2003/0025732 A1 | 2/2003 | Prichard | |
| 2003/0035917 A1 | 2/2003 | Hyman | 428/67 |
| 2003/0038832 A1 | 2/2003 | Sobol | 715/722 |
| 2003/0043211 A1 | 3/2003 | Kremer et al. | 715/838 |
| 2003/0066025 A1 | 4/2003 | Garner et al. | 715/500 |
| 2003/0070143 A1 | 4/2003 | Maslov | 715/513 |
| 2003/0093490 A1 | 5/2003 | Yamamoto et al. | 709/213 |
| 2003/0097361 A1 | 5/2003 | Huang et al. | 707/10 |
| 2003/0098891 A1 | 5/2003 | Molander | 715/841 |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | |
| 2003/0160821 A1 | 8/2003 | Yoon | |
| 2003/0163455 A1 | 8/2003 | Dettinger et al. | 707/3 |
| 2003/0167310 A1 | 9/2003 | Moody et al. | 709/206 |
| 2003/0167315 A1 * | 9/2003 | Chowdhry et al. | 709/218 |
| 2003/0169284 A1 | 9/2003 | Dettinger et al. | 715/708 |
| 2003/0184585 A1 | 10/2003 | Lin et al. | 345/763 |
| 2003/0195937 A1 | 10/2003 | Kircher et al. | 709/207 |
| 2003/0206646 A1 | 11/2003 | Brackett | 382/128 |
| 2003/0218611 A1 | 11/2003 | Ben-Tovim et al. | 345/440 |
| 2003/0225823 A1 | 12/2003 | Wang et al. | 709/217 |
| 2003/0226106 A1 | 12/2003 | McKellar et al. | 715/513 |
| 2003/0227481 A1 | 12/2003 | Arend et al. | 345/762 |
| 2003/0227487 A1 | 12/2003 | Hugh | 715/777 |
| 2003/0233419 A1 | 12/2003 | Beringer | 709/206 |
| 2004/0003351 A1 | 1/2004 | Sommerer et al. | 715/251 |
| 2004/0012633 A1 | 1/2004 | Helt | 715/764 |
| 2004/0056894 A1 | 3/2004 | Zaika et al. | 345/762 |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 345/764 |
| 2004/0109033 A1 | 6/2004 | Vienneau et al. | 345/863 |
| 2004/0117451 A1 | 6/2004 | Chung | 709/207 |
| 2004/0119760 A1 | 6/2004 | Grossman et al. | 715/854 |
| 2004/0122789 A1 | 6/2004 | Ostertag et al. | |
| 2004/0128275 A1 | 7/2004 | Moehrle | 707/1 |
| 2004/0133854 A1 | 7/2004 | Black | 715/517 |
| 2004/0142720 A1 | 7/2004 | Smethers | 455/550.1 |
| 2004/0153373 A1 | 8/2004 | Song et al. | |
| 2004/0153968 A1 | 8/2004 | Ching et al. | 715/513 |
| 2004/0164983 A1 | 8/2004 | Khozai | 345/440 |
| 2004/0168153 A1 | 8/2004 | Marvin | 717/120 |
| 2004/0181471 A1 | 9/2004 | Rogers | 705/31 |
| 2004/0186775 A1 | 9/2004 | Margiloff et al. | 705/14 |
| 2004/0192440 A1 | 9/2004 | Evans | |
| 2004/0196309 A1 | 10/2004 | Hawkins et al. | |
| 2004/0221234 A1 | 11/2004 | Imai | 715/256 |
| 2004/0221309 A1 | 11/2004 | Zaner et al. | |
| 2004/0230508 A1 | 11/2004 | Minnis et al. | 705/35 |
| 2004/0230906 A1 | 11/2004 | Pik et al. | 715/522 |
| 2004/0239700 A1 | 12/2004 | Baschy | 715/781 |
| 2004/0243938 A1 | 12/2004 | Weise et al. | 715/205 |
| 2004/0268231 A1 | 12/2004 | Tunning | 715/513 |
| 2004/0268235 A1 | 12/2004 | Wason | |
| 2005/0004990 A1 | 1/2005 | Durazo et al. | 709/206 |
| 2005/0005249 A1 | 1/2005 | Hill et al. | 715/963 |
| 2005/0010871 A1 | 1/2005 | Ruthfield et al. | 715/712 |
| 2005/0021504 A1 | 1/2005 | Atchison | 707/3 |
| 2005/0022116 A1 | 1/2005 | Bowman et al. | 715/513 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0057584 A1 | 3/2005 | Gruen et al. | 715/752 |
| 2005/0086135 A1 | 4/2005 | Lu | 705/30 |
| 2005/0091576 A1 | 4/2005 | Relyea | |

(56) References Cited

U.S. PATENT DOCUMENTS

| | | |
|---|---|---|
| 2005/0097511 A1 | 5/2005 | Bergman et al. ............... 717/110 |
| 2005/0108734 A1 | 5/2005 | Need et al. |
| 2005/0117179 A1 | 6/2005 | Ito et al. ...................... 358/1.15 |
| 2005/0137873 A1 | 6/2005 | Liu |
| 2005/0138576 A1 | 6/2005 | Baumert et al. ............... 715/862 |
| 2005/0144241 A1 | 6/2005 | Stata et al. |
| 2005/0154765 A1 | 7/2005 | Seitz et al. ................. 707/104.1 |
| 2005/0172262 A1 | 8/2005 | Lalwani ........................ 717/109 |
| 2005/0183008 A1 | 8/2005 | Crider et al. ................. 715/517 |
| 2005/0198573 A1 | 9/2005 | Ali et al. |
| 2005/0203975 A1 | 9/2005 | Jindal et al. .................. 707/204 |
| 2005/0216863 A1 | 9/2005 | Schumacher et al. ........ 715/827 |
| 2005/0223329 A1 | 10/2005 | Schwartz et al. ............. 715/711 |
| 2005/0240902 A1 | 10/2005 | Bunker et al. |
| 2005/0256867 A1 | 11/2005 | Walther et al. .................... 707/5 |
| 2005/0278656 A1 | 12/2005 | Goldthwaite et al. ........ 715/810 |
| 2005/0289156 A1 | 12/2005 | Maryka et al. ............... 707/100 |
| 2006/0015816 A1 | 1/2006 | Kuehner |
| 2006/0020962 A1 | 1/2006 | Stark ............................... 725/32 |
| 2006/0036580 A1 | 2/2006 | Stata ................................ 707/3 |
| 2006/0036945 A1 | 2/2006 | Radtke et al. ................. 715/708 |
| 2006/0036964 A1 | 2/2006 | Satterfield |
| 2006/0036965 A1 | 2/2006 | Harris et al. .................. 715/777 |
| 2006/0041545 A1 | 2/2006 | Heidloff et al. .................. 707/4 |
| 2006/0047644 A1 | 3/2006 | Bocking et al. |
| 2006/0053383 A1 | 3/2006 | Gauthier et al. .............. 715/764 |
| 2006/0059035 A1 | 3/2006 | Kraft |
| 2006/0069684 A1 | 3/2006 | Vadlamani et al. ............. 707/10 |
| 2006/0080303 A1 | 4/2006 | Sargent et al. ................... 707/3 |
| 2006/0080363 A1 | 4/2006 | Vadlamani et al. .......... 707/200 |
| 2006/0080468 A1 | 4/2006 | Vadlamani et al. .......... 709/250 |
| 2006/0095865 A1 | 5/2006 | Rostom ......................... 715/810 |
| 2006/0101051 A1 | 5/2006 | Carr et al. .................... 707/102 |
| 2006/0101350 A1 | 5/2006 | Scott ............................. 715/779 |
| 2006/0111931 A1 | 5/2006 | Johnson et al. .................. 705/1 |
| 2006/0117249 A1 | 6/2006 | Hu et al. ....................... 715/255 |
| 2006/0129937 A1 | 6/2006 | Shafron ......................... 715/733 |
| 2006/0165105 A1 | 7/2006 | Shenfield et al. ............. 370/401 |
| 2006/0173824 A1 | 8/2006 | Bensky ............................. 707/3 |
| 2006/0200432 A1 | 9/2006 | Flinn et al. |
| 2006/0218500 A1 | 9/2006 | Sauve et al. .................. 715/767 |
| 2006/0224946 A1 | 10/2006 | Barrett |
| 2006/0242557 A1 | 10/2006 | Nortis, III ..................... 715/234 |
| 2006/0242575 A1 | 10/2006 | Winser .......................... 715/530 |
| 2006/0242591 A1 | 10/2006 | Van Dok |
| 2006/0253830 A1 | 11/2006 | Rajanala et al. .............. 717/105 |
| 2006/0294452 A1 | 12/2006 | Matsumoto .................... 715/236 |
| 2007/0006075 A1* | 1/2007 | Lection et al. ................ 715/530 |
| 2007/0006206 A1 | 1/2007 | Dhanjal et al. ................ 717/168 |
| 2007/0006327 A1 | 1/2007 | Lal et al. |
| 2007/0016857 A1* | 1/2007 | Polleck et al. ................ 715/530 |
| 2007/0050401 A1 | 3/2007 | Young et al. ................. 707/102 |
| 2007/0050469 A1 | 3/2007 | Gupta et al. |
| 2007/0055936 A1 | 3/2007 | Dhanjal ......................... 715/700 |
| 2007/0055943 A1 | 3/2007 | McCormick |
| 2007/0061306 A1 | 3/2007 | Pell et al. .......................... 707/3 |
| 2007/0061307 A1 | 3/2007 | Hartwell et al. .................. 707/3 |
| 2007/0061308 A1 | 3/2007 | Hartwell et al. .................. 707/3 |
| 2007/0061705 A1 | 3/2007 | Ammerlaan |
| 2007/0083813 A1 | 4/2007 | Lui et al. ........................... 715/9 |
| 2007/0094597 A1 | 4/2007 | Rostom ......................... 715/700 |
| 2007/0094608 A1 | 4/2007 | Getsch |
| 2007/0106951 A1 | 5/2007 | McCormack et al. ........ 715/764 |
| 2007/0143671 A1 | 6/2007 | Paterson et al. .............. 715/700 |
| 2007/0156519 A1 | 7/2007 | Agassi et al. ................... 705/14 |
| 2007/0179841 A1 | 8/2007 | Agassi et al. ................... 705/14 |
| 2007/0185826 A1 | 8/2007 | Brice et al. ....................... 707/1 |
| 2007/0209008 A1* | 9/2007 | Mori ................. G06F 17/30873 715/742 |
| 2007/0234223 A1 | 10/2007 | Leavitt et al. |
| 2007/0234290 A1 | 10/2007 | Ronen et al. .................. 717/120 |
| 2007/0240057 A1 | 10/2007 | Satterfield et al. ............ 715/705 |
| 2007/0260996 A1 | 11/2007 | Jakobson ....................... 715/781 |
| 2007/0279417 A1 | 12/2007 | Garg et al. ..................... 345/440 |
| 2007/0283287 A1 | 12/2007 | Taylor et al. .................. 715/769 |
| 2007/0300168 A1 | 12/2007 | Bosma et al. ................. 715/820 |
| 2008/0005686 A1 | 1/2008 | Singh |
| 2008/0034304 A1 | 2/2008 | Feuerbacher et al. ......... 715/764 |
| 2008/0040682 A1 | 2/2008 | Sorenson et al. ............. 715/777 |
| 2008/0077571 A1 | 3/2008 | Harris et al. ....................... 707/5 |
| 2008/0141156 A1 | 6/2008 | Reik |
| 2008/0178110 A1 | 7/2008 | Hill et al. ...................... 715/771 |
| 2008/0209316 A1 | 8/2008 | Zandstra |
| 2008/0216014 A1 | 9/2008 | Kurtenbach et al. |
| 2008/0263462 A1 | 10/2008 | Mayer-Ullmann |
| 2009/0007003 A1 | 1/2009 | Dukhon et al. ............... 715/778 |
| 2009/0031295 A1 | 1/2009 | Zhao |
| 2009/0034618 A1 | 2/2009 | Fu et al. |
| 2009/0064090 A1 | 3/2009 | Anonson |
| 2009/0083656 A1 | 3/2009 | Dukhon et al. ............... 715/781 |
| 2009/0100009 A1 | 4/2009 | Karp |
| 2009/0163183 A1 | 6/2009 | O'Donoghue et al. |
| 2009/0205013 A1 | 8/2009 | Lowes |
| 2009/0217192 A1 | 8/2009 | Dean et al. .................... 715/777 |
| 2009/0217263 A1 | 8/2009 | Gebhart et al. ..................... 718/1 |
| 2009/0222763 A1 | 9/2009 | Dukhon et al. ............... 715/808 |
| 2009/0259950 A1 | 10/2009 | Sullivan et al. ............... 715/762 |
| 2010/0146478 A1 | 6/2010 | Head et al. .................... 717/101 |
| 2010/0180226 A1 | 7/2010 | Satterfield et al. ............ 715/777 |
| 2010/0199261 A1 | 8/2010 | Shenfield et al. |
| 2011/0055690 A1 | 3/2011 | Wason |
| 2011/0296322 A1 | 12/2011 | Dhanjal et al. ............... 715/760 |
| 2011/0307798 A1 | 12/2011 | Lezama Guadarrama et al. ........ 715/744 |
| 2013/0014048 A1 | 1/2013 | Satterfield et al. |
| 2013/0305141 A1 | 11/2013 | Wason |
| 2016/0117069 A1 | 4/2016 | Harris et al. |

FOREIGN PATENT DOCUMENTS

| | | | |
|---|---|---|---|
| EP | 0 774 722 A2 | 5/1997 | |
| EP | 1 077 405 A2 | 2/2001 | ............... G06F 9/44 |
| EP | 1 223 503 A2 | 7/2002 | |
| EP | 1 462 999 A2 | 9/2004 | ............. G06F 11/60 |
| EP | 1 542 133 A2 | 6/2005 | ............. G06F 17/22 |
| EP | 1628197 A2 | 2/2006 | |
| GB | 2 329 813 | 3/1999 | |
| JP | 2003-526820 | 9/2003 | |
| JP | 2004-512578 | 4/2004 | |
| JP | 2006-059358 | 3/2006 | |
| JP | 2009-507311 | 2/2009 | |
| JP | 4832024 | 12/2011 | |
| KR | 10-2002-0004723 | 1/2002 | ............. G06F 17/00 |
| KR | 1020020072039 A | 9/2002 | |
| KR | 10-2003-0070685 | 9/2003 | |
| KR | 10-0450881 B1 | 9/2004 | |
| KR | 10-2005-0023805 A | 3/2005 | ............... G06F 9/46 |
| KR | 10-2005-0036702 A | 4/2005 | ............... G06F 3/12 |
| KR | 2005-0072073 A | 7/2005 | |
| KR | 1020070116957 A | 12/2005 | |
| KR | 2008-0002811 A | 1/2008 | |
| KR | 10-2008-0021262 | 3/2008 | ............... G06F 9/44 |
| KR | 1020080021262 | 3/2008 | |
| KR | 10-1149960 | 5/2012 | |
| KR | 10-1149990 | 5/2012 | |
| MY | 147334 | 7/2013 | |
| MY | 149803 | 10/2013 | |
| RU | 2001-122576 A | 8/2005 | |
| RU | 2004-108142 | 8/2005 | |
| RU | 2332728 C2 | 8/2008 | |
| RU | 2537776 | 1/2015 | |
| TW | 460839 | 10/2001 | |
| TW | 490652 | 6/2002 | |
| TW | 527812 | 4/2003 | |
| TW | 569122 | 1/2004 | |
| TW | 200514018 A | 4/2005 | |
| WO | WO 96/39654 | 12/1996 | |
| WO | WO 03/003240 A2 | 1/2003 | ............. G06F 17/20 |
| WO | WO2005/103900 | 11/2005 | ............. G06F 11/30 |
| WO | WO 2007/027737 A1 | 3/2007 | |

(56) References Cited

FOREIGN PATENT DOCUMENTS

| WO | 2007/036762 A1 | 4/2007 |
|---|---|---|
| WO | WO 2008-121718 | 10/2008 |
| WO | 2009/123801 | 10/2009 |

OTHER PUBLICATIONS

ScreenShot of MS_Office_2003; (Microsoft Corporation, Microsoft Office Professional Edition 2003; 6 pages).
Philippines Examiner's Action dated Mar. 11, 2010 cited in Appln No. 1-2005-000405.
Australian Office Action dated Mar. 25, 2010 cited in Appln No. 2005203411.
Australian Office Action dated Apr. 8, 2010 cited in Appln No. 2005203410.
PCT Written Opinion and Search Report dated Sep. 2, 2010 cited in International Application No. PCT/US2010/021888.
Australian Office Action dated Oct. 21, 2010 cited in Appln No. 2006284908.
Israeli Office Action dated Oct. 28, 2010 cited in Appln No. 169716.
Chinese Second Office Action dated Oct. 29, 2010 cited in Appln No. 200680030421.2.
U.S. Official Action dated Dec. 8, 2010 in U.S. Appl. No. 10/955,967.
U.S. Appl. No. 12/414,317, filed Mar. 30, 2009 entitled "Scope-Based Extensibility for Control Surfaces".
European Search Report mailed Dec. 2, 2008, having Application No. EP 06 79 0087.
International Search Report and Written Opinion mailed Jan. 9, 2007, Application No. PCT/US2006/033809.
European Office Action mailed Mar. 9, 2009, Application No. 06790087.8.
U.S. Official Action dated Nov. 25, 2008 in U.S. Appl. No. 11/154,278.
U.S. Official Action dated Jun. 10, 2009 in U.S. Appl. No. 11/154,278.
U.S. Official Action dated Sep. 15, 2009 in U.S. Appl. No. 11/217,071.
U.S. Official Action dated Nov. 13, 2009 in U.S. Appl. No. 11/154,278.
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.

(56) References Cited

OTHER PUBLICATIONS

Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z0lzks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
"Creating Charts: An Introduction," Excel for Chemists: . A Comprehensive Guide, E. Joseph Billo. http://www.ahut.edu.cn/yxsz/ahk/Teaching/Excel%for%20Chemists/ChQ2.pdf.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
"TeeChart for .NET Charting Control," TeeChart for NET Steema Software. http://Iwww.teechart.net.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).

Krill, P., "Microsoft's Ribbon Interface Draws Frowns, Smiles," *Info World*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
"User Interface Architecture," Data Master 2003, 2 pages.
Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.
Selca, Viki "Customizing the Office Fluent User interface in Access 2007," Microsoft Corporation, Dec. 2006, 22 pages.
U.S. Appl. No. 10/800,056, filed Mar. 12, 2004 entitled "Method and System for Data Binding in a Block Structured User Interface Scripting Language".
U.S. Appl. No. 09/620,876, filed Jul. 21, 2000 entitled "On-Object User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 12/372,386, filed Feb. 17, 2009 entitled "Command User Interface for Displaying Multiple Sections of Software Functionality Controls".
U.S. Appl. No. 10/955,967, filed Sep. 30, 2004 entitled "Command User Interface for Displaying Selectable Softare Functionality Controls".
U.S. Appl. No. 10/780,547, filed Feb. 17, 2004 entitled "Method and System for Separation of Content and Layout Definitions in a Display Description" (Perkins Case).
W3C, "Positioning HTML Elements with Cascading Style Sheets," Aug. 19, 2007, pp. 1-14, Retrieved from the Internet <http://www.w3.org/TR/NOTE-layout>.
C. Jacobs et al., "Adaptive Grid-Based Document Layout", Microsoft Research, ACM, Jul. 2003, pp. 838-847.

(56) References Cited

OTHER PUBLICATIONS

J. Bateman et al., "Towards Constructive Text, Diagram, and Layout Generation for Information Presentation", Association for Computational Linguistics, 2001, pp. 409-449.
S. Feiner, "A Grid-Based Approach to Automating Display Layout", In Proceedings of Graphics Interface'88, pp. 249-254.
K. Gajos et al., "Supple: Automatically Generating User Interfaces", ACM, Jan. 2004, pp. 1-8.
Chinese First Office Action dated Mar. 21, 2008 cited in Appln No. 200510092146.4.
Chilean Office Action dated Mar. 28, 2008 cited in Appln No. 1770-2005, no English Translation.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Aug. 19, 2008 cited in Appln No. 12005000405.
Chilean Office Action dated Sep. 23, 2008 cited in Appln No. 1770-2005.
Chilean Office Action dated Nov. 27, 2008 cited in Appln No. 1768-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Russian Office Action dated Jul. 21, 2009 cited in Appln No. 2005125837/09(029011).
Israeli Office Action dated Sep. 6, 2009 cited in Appln No. 169716.
Russian Office Action dated Sep. 10, 2009 cited in Appln No. 2005125839/09(029013).
Chinese Office Action dated Oct. 16, 2009 cited in Appln No. 200510092142.6.
Chilean Second Office Action dated Nov. 4, 2009 cited in Appln No. 1770-2005.
Chilean Office Action dated Dec. 4, 2009 cited in Appln No. 1768-2005.
U.S. Official Action dated Apr. 27, 2006 in U.S. Appl. No. 10/800,056.
U.S. Official Action dated Oct. 19, 2006 in U.S. Appl. No. 10/800,056.
U.S. Official Action dated Jun. 14, 2007 in U.S. Appl. No. 10/780,547 (Perkins matter).
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 13, 2007 in U.S. Appl. No. 10/800,056.
U.S. Official Action dated Oct. 4, 2007 in U.S. Appl. No. 10/780,547 (Perkins matter).
U.S. Official Action dated Dec. 28, 2007 in U.S. Appl. No. 10/800,056.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 14, 2008 in U.S. Appl. No. 10/780,547 (Perkins matter).
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Feb. 20, 2009 in U.S. Appl. No. 10/780,547 (Perkins matter).
U.S. Official Action dated Aug. 4, 2009 in U.S. Appl. No. 10/955,967.
U.S. Official Action dated Sep. 15, 2009 in U.S. Appl. No. 10/780,547 (Perkins matter).
U.S. Official Action dated Jan. 20, 2010 in U.S. Appl. No. 10/955,967.
T. Shih et al., "A Stepwise Refinement Approach to Multimedia Presentation Designs", IEEE, Oct. 1997, pp. 117-122.
Russian Office Action dated Oct. 30, 2009 cited in Appln No. 2005125837/09(029011).
U.S. Official Action dated Mar. 3, 2010 in U.S. Appl. No. 10/780,547 (Perkins matter).
U.S. Official Action dated Mar. 22, 2011 in U.S. Appl. No. 11/217,071.
U.S. Appl. No. 12/814,084, filed Jun. 11, 2010 entitled "Merging Modifications to User Interface Components While Preserving User Customization".
U.S. Appl. No. 12/331,451, filed Dec. 10, 2008 entitled "Multi-Layered Storage and Management of Software Components" (Microsoft case).
U.S. Appl. No. 12/725,605, filed Mar. 17, 2010 entitled "Improved User Interface for Displaying Selectable Software Functionality Controls that are Relevant to a Selected Object".
U.S. Official Action dated Mar. 30, 2010 in U.S. Appl. No. 11/217,071.
Chinese Third Office Action dated Feb. 12, 2010 cited in Appln No. 200510092142.6.
Clifton, The Application Automation layer—Using XML to Dynamically Generate GUI Elements—forms and controls, The Code Project, Jun. 2003, pp. 1-37.
U.S. Official Action dated Jul. 6, 2010 in U.S. Appl. No. 10/955,967.
Parry; "*CREWS: A Component-Driven, Run-Time Extensible Web Service Framework*"; http://eprints.ru.ac.za/74/01/Parry-MSC.pdf; Dec. 2003; 103 Pgs.
Louw, et al.; "*Extensible Web Browser Security*"; http://www.cs.uic.edu/~venkat/research/papers/extensible-browser-dimva07.pdf; pp. 1-20.
International Search Report mailed Aug. 7, 2009, in PCT Application No. PCT/US2009/034618.
U.S. Official Action dated Sep. 21, 2010 in U.S. Appl. No. 11/217,071.
Japanese Notice of Rejection dated Dec. 16, 2011 cited in Appln No. 2008-529218.
U.S. Official Action dated Jan. 17, 2012 in U.S. Appl. No. 11/217,071.
U.S. Official Action dated Jan. 19, 2012 in U.S. Appl. No. 12/814,084.
Ribbons; Microsoft; © 2012 Microsoft; http://msdn.microsoft.com/en-us/library/windows/desktop/cc872782.aspx; 45 pgs. (Cited in Apr. 10, 2012 NOA).
AutoCAD 2011—Customization Guide; Feb. 2010; Autodesk, Inc.; http://images.autodesk.com/adsk/files/acad_acg.pdf; 554 pgs. (Cited in Apr. 10, 2012 NOA).
European Search Report dated Feb. 10, 2012 cited in Appln No. 05107153.8.
European Search Report dated Feb. 15, 2012 cited in Appln No. 05107157.9.
Taiwan Search Report dated Mar. 14, 2012 cited in Appln No. 094123420.
European Search Report dated Mar. 16, 2012 cited in Appln No. 05107186.6.
U.S. Official Action dated Apr. 19, 2012 in U.S. Appl. No. 13/102,633.
Malaysian Substantive Examination Adverse Report dated Mar. 15, 2011 cited in Appln No. PI 20053260.
Egypt Official Decision dated Mar. 14, 2011 cited in Appln No. 2005080371.
Mexican Office Action dated Mar. 31, 2011 cited in Appln No. PA/a/2005/008351.
Mexican Office Action dated Mar. 31, 2011 cited in Appln No. PA/a/2005/008349.
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.

(56) References Cited

OTHER PUBLICATIONS

Malaysian Substantive Examination Adverse Report dated Jan. 31, 2012 cited in Appln No. PI 20053258.
European Search Report dated Feb. 23, 2012 cited in Appln No. 05107153.8.
U.S. Official Action dated Feb. 27, 2012 in U.S. Appl. No. 12/372,386.
Malaysian Examination Report dated Aug. 30, 2012 in Appln No. PI 20080400.
U.S. Official Action dated Aug. 29, 2012 in U.S. Appl. No. 11/217,071.
U.S. Official Action dated Oct. 24, 2012 in U.S. Appl. No. 13/102,633.
U.S. Appl. No. 13/615,668, filed Sep. 14, 2012 entitled "User Interface for Displaying Selectable Software Functionality Controls that are Relevant to a Selected Object".
U.S. Appl. No. 13/595,084, filed Aug. 27, 2012 entitled "Command User Interface for Displaying Selectable Software Functionality Controls".
Canadian Office Action dated Nov. 29, 2012 cited in Appln No. 2,512,047.
Mexican Office Action dated Feb. 25, 2013 in Appln No. MX/a/2008/002889, 11 pgs.
U.S. Official Action dated Jan. 25, 2013 in U.S. Appl. No. 12/414,317, 29 pgs.
Russian Office Action dated Dec. 12, 2012 cited in Appln No. 2010140069.
Mexican Office Action dated Apr. 24, 2013 cited in MX/a/2010/010506.
Mexican Office Action dated Jul. 9, 2013 in Appln No. MX/a/2008/002889.
Chinese Third Office Action dated Jul. 18, 2013 cited in Appln No. 200980112454.5, 7 pgs.
Russian Office Action dated Aug. 12, 2013 in Appln No. 2010140069.
Australian Examination Report dated Nov. 22, 2013 in Appln No. 2009232301.
Chinese Fourth Office Action dated Dec. 4, 2013 in Appln No. 200980112454.5.
U.S. Official Action dated Jun. 3, 2013 in U.S. Appl. No. 13/102,622, 29 pgs.
U.S. Official Action dated Aug. 6, 2013 in U.S. Appl. No. 12/414,317, 26 pgs.
U.S. Appl. No. 14/032,094, filed Sep. 19, 2013 entitled "User Interface for Displaying Selectable Software Functionality Controls that are Relevant to a Selected Object", Satterfield et al.
U.S. Official Action dated Nov. 8, 2013 in U.S. Appl. No. 13/615,668.
U.S. Official Action dated Jul. 1, 2014 in U.S. Appl. No. 12/372,386, 93 pgs.
Japanese Notice of Allowance Issued in Patent Application No. 2011-550149, Mailed Date: May 8, 2014, Filed Date: Jan. 22, 2010, 4 pgs.
Australian Second Office Action Issued in Patent Application No. 2010216342, Mailed Date: May 12, 2014, Filed Date: Jan. 22, 2010, 3 pgs.
European Extended Search Report dated Jul. 16, 2014 in Appln No. PCT/US2009/034618, 6 pgs.
Russian Decision on Grant dated Jul. 20, 2014 in Appln No. 2010138162, 14 pgs.—No English Language Translation.
Korean Notice of Preliminary Rejection dated Feb. 22, 2013 in Appln No. 10-2008-7005078
U.S. Official Action dated Jan. 16, 2014 in U.S. Appl. No. 13/102,633, 45 pgs.
India First Examination Report dated Mar. 19, 2014 in Appln No. 1818/DEL/2005, 1 pg.
Canadian Office Action dated Apr. 25, 2014 in Appln No. 2,512,155, 9 pgs.
U.S. Official Action dated May 14, 2014 in U.S. Appl. No. 13/615,668, 34 pgs.

U.S. Appl. No. 14/635,605, filed Mar. 2, 2015 entitled "Command User Interface for Displaying Selectable Software Functionality Controls".
Akamatsu, "Touch with a Mouse, A Mouse Type Interface Device with Tactile and Force Display"; © IEEE; 1995; 5 pgs.
Russian Notice of Allowance Received for Russian Federation Patent Application No. 2010140069, Mailed Date: Nov. 26, 2013, Filed Date: Feb. 20, 2009, 18 Pages.
Japanese Office Action Issued in Patent Application No. 2011-550149, Mailed Date: Jan. 20, 2014, Filed Date: Jan. 22, 2010, 5 Pages.
Australian Notice of Allowance Received for Patent Application No. 2009232301, Mailed Date: Jan. 29, 2014, Filed Date: Feb. 20, 2009, 2 Pages.
Australian Office Action Issued in Patent Application No. 2010216342, Mailed Date: Mar. 14, 2014, Filed Date: Jan. 22, 2010, 3 Pages.
Mexican Office Action Received for Mexican Patent Application No. PA/a/2005/008349, Mailed Date: Mar. 14, 2014, Filed Date: Aug. 5, 2005, 12 Pages. (w/o English Translation).
India First Examination Report Issued in Patent Application No. 1820/DEL/2005, Mailed Date: Mar. 20, 2014, 1 Page.
Chinese Fifth Office Action Received for Patent Application No. 200980112454.5, Mailed Date: Apr. 2, 2014, Filed Date: Feb. 20, 2009, 19 Pages.
Russian Notice of Allowance Issued in Patent Application No. 2011134380, Mailed Date: Apr. 5, 2014, Filed Date: Jan. 22, 2010, 22 Pages.
Taiwan Office Action and Search Report Issued in Patent Application No. 98145363, Mailed Date: Oct. 2, 2014, 25 Pages.
Israel Office Action Issued in Patent Application No. 169717, Mailed Date: Oct. 29, 2014, 1 Page; (w/o English Translation).
Norwegian Office Action Received for Patent Application No. 20053656, Mailed Date: Nov. 19, 2014, 2 pgs.
Norwegian Office Action dated Nov. 29, 2014 in Appln No. 20053658, 4 pgs.
Indonesian Office Action Issued in Patent Application No. P00200500444, Mailed Date: Jan. 16, 2015, 3 Pages. (w/o English Translation).
Israeli Office Action Issued in Patent Application No. 213908, Mailed Date: Feb. 3, 2015, 3 pages. (w/o English Translation).
Canadian Office Action dated Feb. 19, 2015 in Appln No. 2,848,667, 5 pgs.
Canadian Office Action dated Feb. 19, 2015 in Appln No. 2,848,700, 4 pgs.
U.S. Official Action dated Sep. 30, 2014 in U.S. Appl. No. 13/595,084, 185 pgs.
U.S. Official Action dated Oct. 24, 2014 in U.S. Appl. No. 13/615,668, 35 pgs.
Embedding and Linking Excel Worksheets into Word; 2001, The McGraw-Hill Companies, Inc, 6 pgs.
Malaysian Notice of Allowance Received in Patent Application No. PI 20080400, Mailed Date: Sep. 13, 2013, Filed Date: Aug. 29, 2006, 2 Pages.
Mexican Notice of Allowance Received in Patent Application No. MX/a/2008/002889, Mailed Date: Apr. 1, 2014, Filed Date: Aug. 29, 2006, 1 Page. (w/o English Translation).
Canadian Office Action dated Sep. 30, 2014 in Appln No. 2,617,182, 3 pgs.
U.S. Official Action dated Jul. 30, 2014 in U.S. Appl. No. 13/102,633, 36 pgs.
U.S. Official Action dated Dec. 24, 2014 in U.S. Appl. No. 13/102,633, 42 pgs.
Israeli Office Action dated Mar. 2, 2015 in Appln No. 213908, 5 pgs.
Korean Office Action Issued in Patent Application No. 10-2010-7024459, Mailed Date: May 18, 2015, 4 Pages; (w/o English Translation).
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Notice of Allowance dated Apr. 16, 2015 in U.S. Appl. No. 13/595,084, 19 pgs.

(56) References Cited

OTHER PUBLICATIONS

Chinese Office Action Issued in Patent Application No. 200980112454.5, Mailed Date: Jun. 5, 2012, 8 Pages.
Chinese Second Office Action Issued in Patent Application No. 200980112454.5, Mailed Date: Apr. 2, 2013, 7 Pages.
Korean Office Action Issued in Patent Application No. 10-2010-7024459, Mailed Date: Nov. 25, 2015, 9 Pages.
Mexican Office Action Issued in Patent Application No. MX/a/2010/010506, Mailed Date: Nov. 20, 2015, 7 Pages.
Canadian Office Action Issued in Patent Application No. 2,512,155, Mailed Date: Nov. 30, 2015, 7 Pages.
International Preliminary Report on Patentability Issued in PCT Application No. PCT/US09/34618, Mailed Date: Oct. 5, 2010, 7 Pages.
U.S. Official Action dated Jan. 4, 2016 in U.S. Appl. No. 13/615,668, 28 pgs.
EP Communication dated Jan. 5, 2016 in Appln. No. 09 727 331.2, 4 pgs.
U.S. Official Action dated Jun. 12, 2015 in U.S. Appl. No. 13/615,668, 26 pgs.
U.S. Appl. No. 13/102,633, filed May 6, 2011 entitled "Markup Based Extensibility for User Interfaces".
Chinese Office Action dated Aug. 26, 2011 cited in Appln No. 200980112454.5.
U.S. Official Action dated Sep. 13, 2011 in U.S. Appl. No. 12/372,386.
European Office Action in Application 05107153.8, mailed Jul. 22, 2016, 6 pgs.
European Office Action in Application 05107186.8, mailed Jul. 27, 2016, 6 pgs.
Israeli Office Action Issued in Patent Application No. 221792, Mailed Feb. 16, 2016, 4 pgs.
Korean Notice of Preliminary Rejection Issued in Patent Application No. 10-2011-7018813, Mailed Date: Jan. 8, 2016, 4 Pages.
Mori et al., Design and Development of Multidevice User Interfaces through Multiple Logical Descriptions, © 2004; IEEE; 14 pgs.
Notice of Allowance dated Mar. 15, 2016 in U.S. Appl. No. 14/032,094, 35 pgs.
U.S. Appl. No. 14/032,094, Notice of Allowance mailed Jun. 24, 2016, 8 pgs.
U.S. Appl. No. 14/032,094, Notice of Allowance mailed Aug. 9, 2016, 2 pgs.
Korean Notice of Allowance in Patent Application No. 10-2010-7024459, mailed May 31, 2016, 2 Pages; (w/o English Translation).
Canadian Notice of Allowance in Application 2750422, mailed Mar. 10, 2016, 1 page.
Chilean Notice of Allowance in Application 201101987, mailed Mar. 30, 2016, 2 pgs; (w/o English translation).
Korean Office Action in Patent Application No. 10-2011-7018813, mailed Jul. 29, 2016, 3 pgs; w/o English translation).
Malaysian Adverse Report in Application PI 2011003348, mailed Mar. 15, 2016, 3 pgs.
U.S. Appl. No. 13/615,668, Office Action mailed Sep. 1, 2016, 18 pgs.
U.S. Appl. No. 14/032,094, Notice of Allowance mailed Sep. 30, 2016, 9 pgs.
Canadian Office Action in Application 2512155, mailed Aug. 26, 2016, 4 pgs.
Chilean Office Action in Application 200501770, mailed Sep. 2, 2016, 2 pgs. (no English translation).
Thailand Notice of Allowance in Application 0501003162, mailed Sep. 13, 2016, 1 page.
Norway Office Action dated Sep. 15, 2015 in Appln No. 20053658, 1 page (no English translation).
European Extended Search Report in Application 10744106.5, mailed Jan. 10, 2013, 8 pgs.
"Index Card Metaphor for Multiple Property Sheets Associated With a Given Object", IBM Technical Disclosure Bulletin, IBM Corp., vol. 33, No. 3A, Aug. 1, 1990, pp. 31-32.
"Office Action Issued in Korean Patent Application No. 10-2016-7024123", Mailed Date: Nov. 18, 2016, 6 Pages. (w/o English Translation).
Taiwan Notice of Allowance in Appln No. 101133155, mailed Sep. 4, 2015, 4 pgs.

\* cited by examiner

ASSOCIATING COMMAND SURFACES WITH MULTIPLE ACTIVE COMPONENTS

BACKGROUND

In order to accommodate the diverse components supported by web platforms and applications, many online products and services implement user interface designs with distributed commands. These user interfaces feature numerous, distinct command surfaces such that each component in the application has its own command set. Each application is tightly integrated with its associated component in the user interface. For example, a web page may include two different components that include similar functionality (i.e. two different textboxes) but each component includes its own independent command surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The same command surface may be associated with unrelated components and applications on a page. Components register the commands associated with a shared command surface that they will be utilizing. Each component may utilize an arbitrary number of commands that are associated with the command surface. A command manager acts as a message broker between the components on the page and the shared command surfaces. When a command that is associated with a command surface is received, the command manager dispatches the command message to the appropriate components.

DETAILED DESCRIPTION

Figure 1:
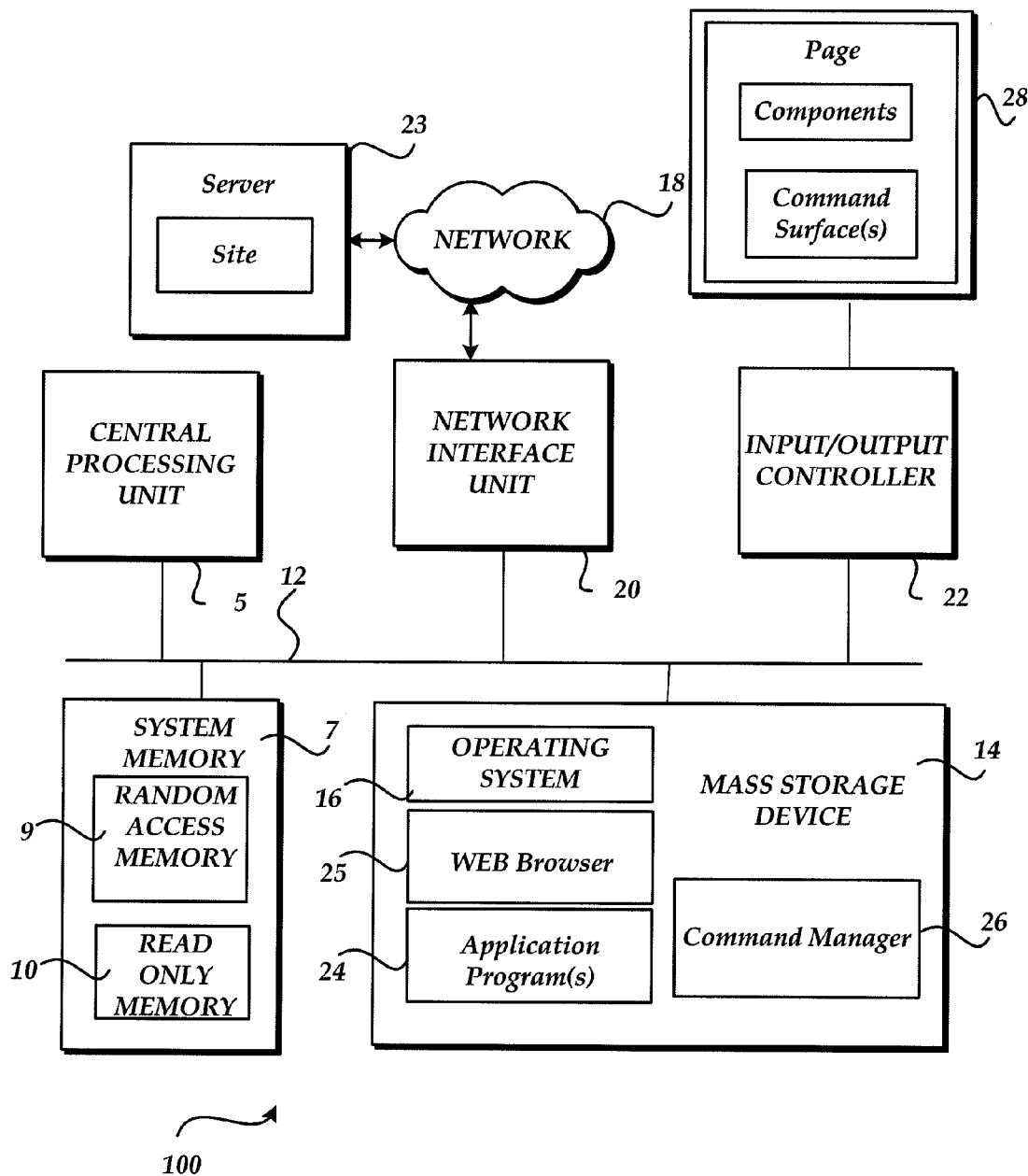
FIG. 1 illustrates an exemplary computing system.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. While computer 100 is generally illustrated as a client computing device, computer 100 may be configured as a client, a server, mobile device, or any other computing device. Computer 100 includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. Computer 100 may also be coupled to data source(s) (not shown) through a network connection 18, and/or some other connection.

As mentioned briefly above, a number of program modules and data files may be stored in the mass storage device 14 and RAM 9 of the computer 100, including an operating system 16 suitable for controlling the operation of a networked personal computer, such as the WINDOWS VISTA® operating system from MICROSOFT CORPORATION of Redmond, Wash. The mass storage device 14 and RAM 9 may also store one or more program modules. In particular, the mass storage device 14 and the RAM 9 may store one or more application programs 24, such as a web browser application 25. For example, browser program 25 may be the MICROSOFT INTERNET EXPLORER® application.

Server 23 is configured to provide site services for computer 100. As illustrated, server 23 includes site software that is configured to provide a site that is accessed through browser application 25 on client 100. According to one embodiment, the site software, such as MICROSOFT SHAREPOINT SERVICES® may be used to provide collaboration tools, document storage tools and workflow tools that are associated with a site. For example, a site may be created with components that provide users (team members) with ways to share documents; share calendar or event information; generate and discuss ideas about a project; and adding, assigning, and tracking tasks concerning a project. The site may be configured as an Internet Site, Extranet Site, and/or an Intranet site or any other site that is accessible to users.

User interface (UI) 28 is designed to provide a user with a visual way to view the site and to interact with command surfaces and components on a web page. Instead of each command surface on a page being directly coupled to only one component on a page, the command surface may be coupled to more than one component on a page, even when the components are associated with different applications. As illustrated in UI 28, the same command surface on a page is associated with two different components (C1 and C2). The command surface may be a command surface such as a Ribbon, a toolbar, a pie menu, and the like. The components on the page may be unrelated and associated with different applications. Generally, each component registers the commands associated with a command surface that they will be utilizing with command manager 26. Command manager 26 acts as a message broker between the components on the page and the command surfaces. Each component may utilize an arbitrary number of commands that are associated with the command surface. For example, component C1 may use three of the commands from the command surface and C2 could use two of the commands. A component (e.g. C3) could be a component that is not visible to a user. For example, component C3 could be a spell checker that registers to be informed of a save command that is associated with the command surface. The components may also attach or detach from a command surface or dynamically change the number of commands during runtime. A component may register a command to be a focused command or a global command. When a command is registered as a global command by a component, then even when the component does not have the current focus it still receives the command when the command is activated on the command surface. When a command is registered as a focused command, then the component receives notification of the command when it is currently has the focus. When a command that is associated with a command surface is received, the command manager 26 dispatches the command message to the appropriate components. The operation of command manager 26 is described in more detail below.

Figure 2:
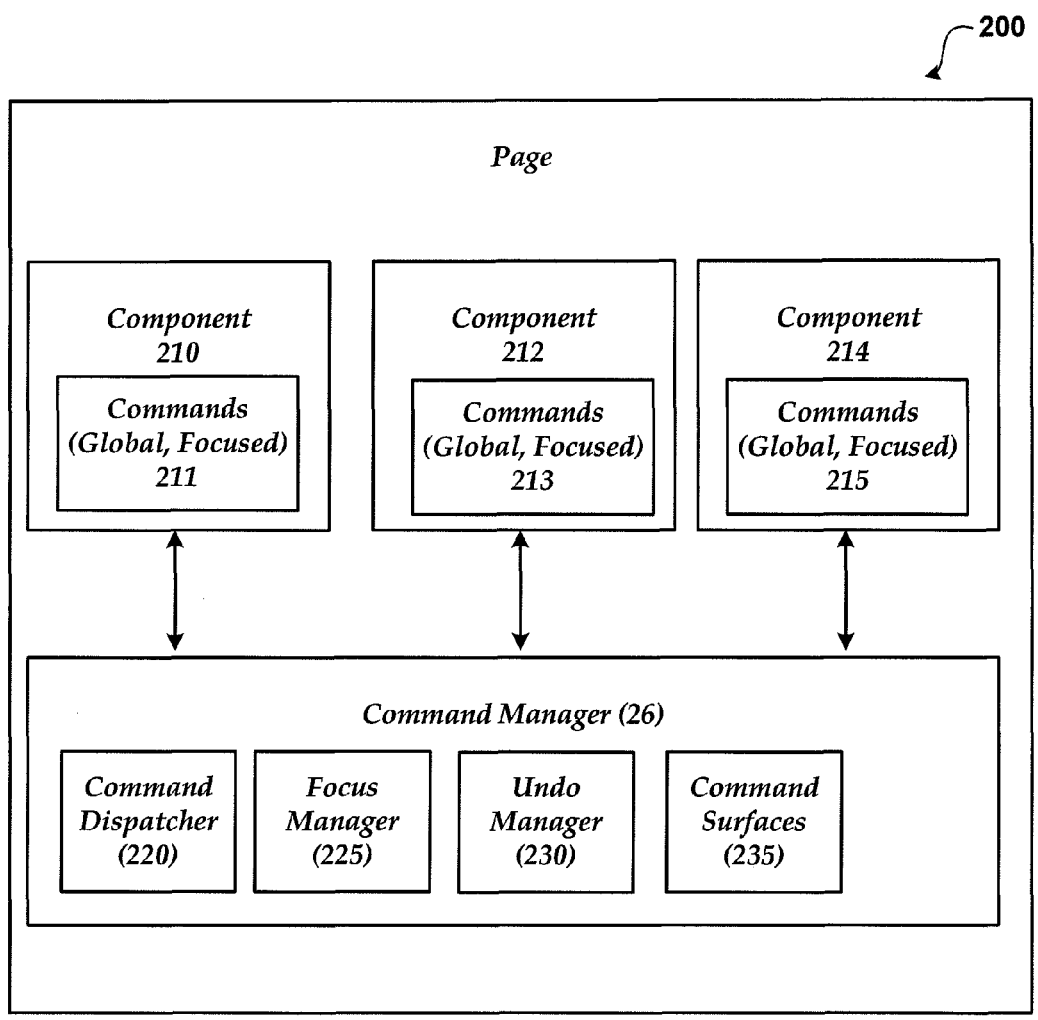
FIG. 2 shows a system for associating command surfaces with multiple active components.

FIG. 2 shows a system for associating command surfaces with multiple active components. As illustrated, system 200 includes page 205, component 210, component 212, component 214 and command manager 26 that includes command dispatcher 220, focus manager 225, undo manager 230, and command surfaces 235.

As discussed above, command manager 26 manages the interaction between the command surfaces and the different components. While command dispatcher 220, focus manager 225, undo manager 230, and command surfaces 235 are shown as integrated within command manager 26, some or all of their functionality may be located externally from command manager 26.

The components on page 205 may represent numerous applications and controls that are hosted in web sites, including web services and web applications. For example, rich text editors, clocks, spread sheet modules, data forms, drawing tools, and the like, are components that may be included on a page.

Any component that desires to utilize a shared command surface registers with command manager 26. After registering, or during registration, the component specifies the commands that they wish to be notified of when they occur on a command surface. According to one embodiment, the commands are specified to the command manager in a list of one or more commands (i.e. commands 211, 213 and 215). A component may specify the command to be a global command or a focused command. A global command is dispatched to the component by the command manager 26 even when that component does not have focus. In this way, a component may react to a command on a command surface even when that component is not active. A focused command is only dispatched to the component when that component has focus. A component may attach a command or detach a command from a command surface at any time. For example, a component may change the active commands available on the command surface based on the change of state of an application. The component may also specify whether or not it may receive focus.

The command manager 26 may periodically, or as a side effect of a particular event on the page, poll the registered components on behalf of the command surfaces in order to determine the state of each command that they are hosting. In one embodiment, this command state is composed of whether the command is currently enabled or disabled in the component and an collection of other state information associated with the command. For example, a "Bold" button may poll for whether it is currently enabled (turned on) or not in addition to whether the button is active in the command surface. According to one embodiment, when a command is received on a command surface (i.e. user clicks on a command) the command manager sends the command to the command dispatcher 220.

Command Dispatcher 220 interacts with the registered components on a page. In this example, command dispatcher 220 is configured to interact with component 210, component 212 and component 214. The command dispatcher is configured to dispatch commands to the components, request the state of commands and determine if the commands are enabled. The command dispatcher keeps a record of the command handlers registered for the commands and uses this information to route the commands and messages to the components. According to one embodiment, the command dispatcher 220 may send other messages to the components and/or additional information along with the dispatched commands. For example, the information may relate to data used in processing the command, state information, and the like. Commands from the command dispatcher may also run through the focus manager 225 as a proxy to help ensure that the correct components receive the commands. According to one embodiment, the focus manager is coupled between the main command dispatcher 220 and the components. In this embodiment, the focused commands are registered with the focus manager 225 and the focus manager 225 in turn registers for them with the main command dispatcher 220. When a command is dispatched through the main command dispatcher 220 into the focus manager 225, the focus manager 225 can then route the command according to which component, if any, currently has the focus.

The focus manager 225 manages the selection of components on page 200. The focus manager 225 is configured to keep track of the component that currently has the focus on the page (the active component). When an event occurs on the page (a user click for example), the component that detects the event may request, with the focus manager 225, that it become the active component. The focus manager 225 will then tell the previously active component to yield the focus. The focus manager 225 will then notify the requesting component that it now has the focus. When a selection occurs outside of an active component on the page, the focus manager may send a message to the components that no component is active, such that each of the components may detach focus. When the component receives focus, the command manager 26 sends a notification to the component such that it may request the current focus. Similarly, the component losing focus may be informed such that it may yield the current focus. According to one embodiment, when another component requests focus, the previously focused component is asked to yield focus by command manager 26.

Undo Manager 230 is used to undo/redo commands that have been executed. Undo manager 230 keeps track of the commands that have been executed, and when an undo or redo command is requested, it helps to ensure that the correct component receives the request to undo or redo the command.

Command surfaces 235 keeps track of the command surface(s) that are associated with the components on the page. The command surface may be any type of command surface such as a Ribbon, a toolbar, a pie menu, and the like. The command surface itself does not handle the processing of a command that is associated with it. Instead, when a command is activated on a command surface, the command manager 26 directs the command to the appropriate components on the page. According to one embodiment, command surfaces in command surfaces 235 support messages to refresh the control states of the commands that are associated as well as to enable/disable the commands for the components. The command surfaces also include defined methods for utilizing the command surface. For example, a method may be provided in a Ribbon control to show a previously unseen contextual tab. Upon initialization of the command surface by command manager 26, it draws its default content. According to one embodiment, the data associated with the command surface is stored within an XML file.

While not illustrated in FIG. 2, other functionality may be included within command manager 26. For example, other managers may be implemented. For instance, a task manager could be programmed to process work requests related to the components.

Figure 3:
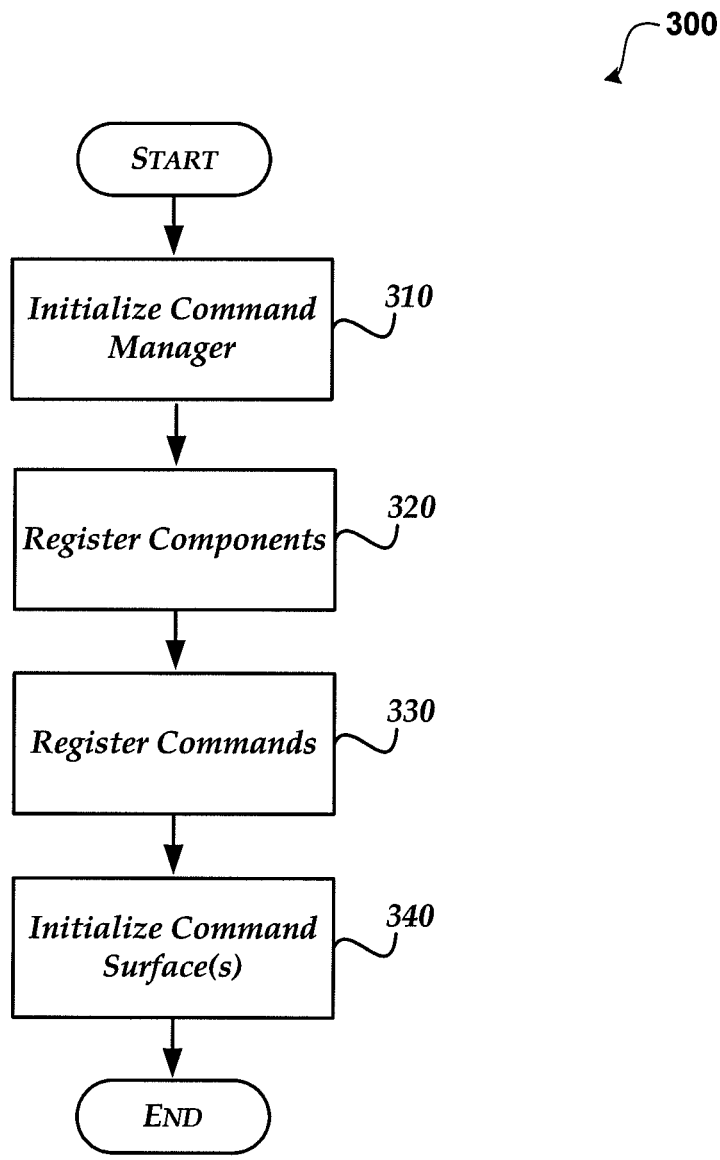
FIG. 3 illustrates a process for associating a command surface with multiple components.

Referring now to FIG. 3, an illustrative process for associating a command surface with multiple components is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, process 300 flows to operation 310 where the command manager is initialized. The command manager acts as a message broker between the components on a page and the command surfaces. According to one embodiment, the command manager initializes the command dispatcher, the focus manager, the undo manager and the command surface(s) that are to be shared among components on the page.

Moving to operation 320, the components on the page are registered with the command manager. Any component on a page that desires to utilize a shared command surface registers with the command manager.

Flowing to operation 330, the components register the commands they wish to be notified of when they occur on a command surface. A component may register to receive focused commands or global commands. When a command is registered as a global command by a component, then even when that component does not have the current focus it still receives the command when the command is activated on the command surface. When a command is registered as a focused command, then that component receives notification of the command only when it is currently has the focus. The component also provides methods to handle the commands when the component is called on to execute the command.

Transitioning to operation 340, the command surface(s) to be associated with the components are initialized. The command surface may be any type of command surface such as a Ribbon, a toolbar, a pie menu, and the like. Command surfaces support messages to refresh the control states of the commands that are associated with components as well as to enable/disable the commands for the components. The command surfaces also include defined methods for utilizing the command surface.

The process then flows to an end operation and returns to processing other actions.

Figure 4:
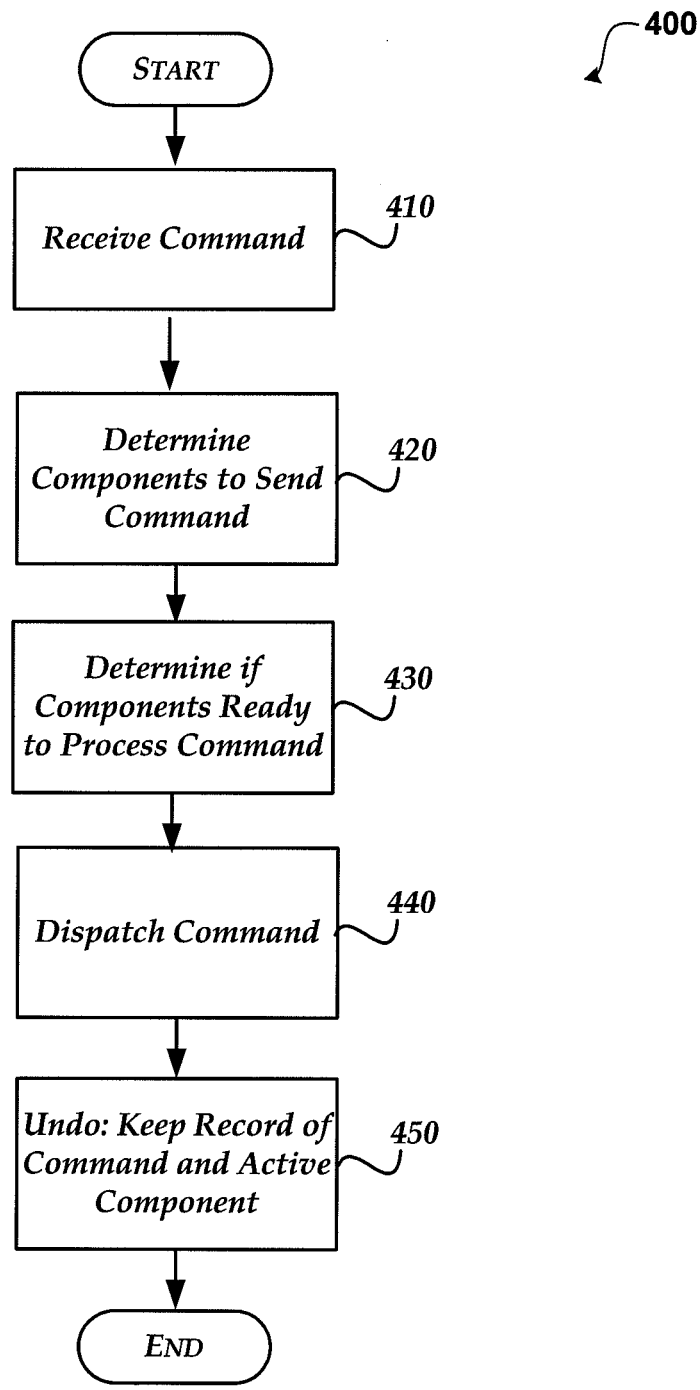
FIG. 4 shows a process for receiving and dispatching a command to components that is received from a command surface.

FIG. 4 shows a process for receiving and dispatching a command to components that is received from a command surface.

After a start operation, process 400 flows to operation 410 where the command is received from a command surface. When a command is activated on a command surface the command is redirected to the command manager that handles the routing of the command to the appropriate components.

Moving to operation 420, the components that are to receive the dispatched command are determined. Generally, the determination of where to dispatch the command is based on which components registered to receive notification of the commands as well as the current focus of the component. For example, as discussed above, some components desire to be informed of a command whenever it occurs, whereas other components desire to be informed only when they have the focus.

At operation 430, a determination may be made as to whether the determined components are ready to process the command. Before dispatching the command to the component(s), the command manager may poll the component(s) to determine if each component is ready to process the command.

For each component that is ready to process the command, the process moves to operation 440 where the command is dispatched to those determined components.

Moving to operation 450, a record is maintained regarding the commands that have been executed on the page and what components were notified. In this way, when an undo or redo command is requested, it helps to ensure that the correct component receives the request to undo or redo the command.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for associating a command surface with active components, comprising:
    associating a command surface on a web page with a first component associated with a first application and associating the command surface on the web page with a second component associated with a second application that is unrelated to the first component; wherein the command surface includes user selectable commands for performing actions;
    accessing a first command list for the first component that identifies the commands included on the command surface that the first component is registering to receive notifications from and accessing a second command list for the second component that identifies the commands included on the command surface that the second component is registering to receive notifications from, wherein the first component and the second component are both registering to receive notifications from at least one same user selectable command on the command surface;
    associating each of the commands in the first command list with the first component and associating each of the commands in the second command list with the second component;
    determining when one of the commands included on the command surface is activated;
    determining when the first component should receive the command based on the command being associated with the first component and determining when the second component should receive the command based on the command being associated with the second component; and
    dispatching the command to the first component for processing when determined that the first component should receive the command and dispatching the command to the second component for processing when determined that the second component should receive the command.

2. The method of claim 1, wherein accessing the first command list and the second command list comprises polling the first component to acquire the first command list and polling the second component to determine the second command list; wherein the first and second components are able to modify their command registration.

3. The method of claim 1, wherein each of the commands in the first command list and the second command list is a global command or a focused command; wherein the global command indicates to dispatch the command regardless of a current focus on a component and wherein the focused command indicates to dispatch the command based on the current focus on the component.

4. The method of claim 3, further comprising determining that the first component is to receive the command when the command is associated with the first component as a global command or a focused command when the first component has the current focus; determining that the second component is to receive the command when the command is associated with the second component as a global command when the first component has the current focus.

5. The method of claim 3, further comprising changing the current focus in response to receiving a request from either the first component or the second component to change the focus or other code on the web page.

6. The method of claim 4, further comprising polling the first component before dispatching the command to determine whether the first component is ready to process the command and polling the second component before dispatching the command to determine whether the second component is ready to process the command.

7. The method of claim 4, further comprising maintaining record of commands that have been processed; and when an undo procedure is initiated informing components of commands to undo.

8. The method of claim 1, wherein the first component and the second component can detach an associated command during runtime.

9. The method of claim 1, wherein the first application and the second application are different applications.

10. A non-transitory computer-readable storage medium having computer-executable instructions that when executed by at least one processor perform a method for associating a command surface with active components, the method comprising:
    initializing a command manager that is configured to act as a broker between a command surface on a web page and active components, including a first component and a second component that is unrelated to the first component; wherein the command surface is not directly coupled to either the first component or the second component and includes user selectable commands for performing actions;
    accessing a first command list for the first component that identifies at least one of the user selectable commands included on the command surface that the first component is registering to receive notifications from and accessing a second command list for the second component that identifies at least one of the user selectable commands included on the command surface that the second component is registering to receive notifications from; wherein the first command list and the second command list comprises commands included on the command surface and wherein the first command list and the second command list each include at least one same user selectable command on the command surface, and wherein the first component and the second component are both registering to receive notifications from at least one same user selectable command on the command surface;
    registering with the command manager each of the commands in the first command list for the first component and each of the commands in the second command list for the second component;
    determining when the first component should receive a command activated on the command surface based on the commands registered for the first component and determining when the second component should receive the command based on the commands registered for the second component; and dispatching, by the command manager, the command to the first component for processing when determined that the first component should receive the command and dispatching the command to the second component for processing when determined that the second component should receive the command.

11. The computer-readable storage medium of claim 10, the method further comprising registering the first component and the second component with the command manager and polling the first component and the second component to acquire the first command list and the second command list.

12. The computer-readable storage medium of claim 10, the method further comprising identifying each of the commands in the first command list and each of the commands in the second command list as a global command or a focused command; wherein the global command indicates to dispatch the command regardless of a current focus on a component and wherein the focused command indicates to dispatch the command based on the current focus on the component.

13. The computer-readable storage medium of claim 10, the method further comprising polling the first component and the second component to determine whether the first component is ready to process the command and to determine whether the second component is ready to process the command.

14. The computer-readable storage medium of claim 10, the method further comprising maintaining record of commands that have been processed; and when an undo procedure is initiated informing components of commands to undo.

15. The computer-readable storage medium of claim 10, the method further comprising detaching one or more of the commands that are registered with the command manager during runtime.

16. A system for associating a command surface with components; comprising:
    at least one processor; a memory; and a computer-readable medium;
    an operating environment stored on the computer-readable medium and executable on the at least one processor;
    a display that is configured to display a web page that includes a command surface that includes user selectable commands; a first component that is associated with a first application and a second component that is unrelated to the first component and is associated with a second application, wherein the command surface is not directly coupled to either the first component or the second component; and
    a command manager that is configured to:
        receive a registration request from the first component and the second component to associate with the command surface;
        receive and access a first command list from the first component that identifies the commands included on the command surface that the first component is registering to receive notifications from and a second command list from the second component that identifies the commands included on the command surface that the second component is registering to receive notifications from; wherein the first command list and the second command list each identify commands included on the command surface and include at least one same user selectable command and wherein the first component and the second component are both registering to receive notifications from at least one same user selectable command on the command surface;
        register each of the commands in the first command list for the first component and register each of the commands in the second command list for the second component;
        receive a command from the command surface when activated and determine when the first component should receive the command based on the commands registered for the first component and determine when the second component should receive the command based on the commands registered for the second component; and
        dispatch the command to the first component for processing when determined that the first component should receive the command and dispatch the command to the second component for processing when determined that the second component should receive the command.

17. The system of claim 16, wherein the command manager is further configured to classify each of the commands in the first command list and each of the commands in the second command list as a global command or a focused command; wherein the global command indicates to dispatch the command regardless of a current focus on a component and wherein the focused command indicates to dispatch the command based on the current focus on the component.

18. The system of claim 16, wherein the command manager is further configured, before dispatching the command to the first component for processing, to poll the first component to determine whether the first component is ready to process the command and, before dispatching the command to the second component for processing, to poll the second component to determine whether the second component is ready to process the command.

19. The system of claim 16, wherein the command manager is further configured to maintain record of commands that have been processed; and when an undo procedure is initiated inform components of the commands to undo.

* * * * *